(12) United States Patent
Galfin (10) Patent No.: US 7,523,949 B1
(45) Date of Patent: Apr. 28, 2009

(54) COMBINATION BAGGAGE TOTE AND POSTURE CHAIR

(76) Inventor: Shelley Galfin, 810 Grand Terrace Ave., Baldwin, NY (US) 11510

(*) Notice: Subject to any disclaimer, the term of this patent is extended or adjusted under 35 U.S.C. 154(b) by 537 days.

(21) Appl. No.: 11/257,426

(22) Filed: Oct. 24, 2005

(51) Int. Cl.
*B62B 3/02* (2006.01)

(52) U.S. Cl. ............... 280/35; 280/639; 280/47.17; 297/188.08; 297/129

(58) Field of Classification Search ............... 280/638, 280/35, 639, 37, 651, 43.1, 47.131, 47.17; 297/129, 217.1, 188.08, 188.09, 188.1
See application file for complete search history.

(56) References Cited

U.S. PATENT DOCUMENTS

| | | | |
|---|---|---|---|
| 2,377,815 | A | 6/1945 | Sides et al. |
| 3,506,280 | A | 4/1970 | Coupe |
| 3,997,213 | A | 12/1976 | Smith et al. |
| 4,290,625 | A | 9/1981 | Barriere |
| 4,323,260 | A | 4/1982 | Suchy |
| 4,460,188 | A * | 7/1984 | Maloof ............... 280/30 |
| 4,733,905 | A | 3/1988 | Buickerood et al. |
| 4,824,167 | A | 4/1989 | King |
| 5,062,650 | A | 11/1991 | Chang |
| 5,265,892 | A | 11/1993 | Said |
| 5,669,659 | A | 9/1997 | Dittmer |
| 5,695,246 | A * | 12/1997 | Tsai ............... 297/335 |
| 5,957,349 | A | 9/1999 | Krulik |
| 6,000,752 | A * | 12/1999 | Shyr ............... 297/188.08 |
| 7,097,017 | B1 * | 8/2006 | LaCrosse et al. ............... 190/8 |
| 7,316,407 | B1 * | 1/2008 | Elden ............... 280/47.25 |
| 7,350,857 | B2 * | 4/2008 | Bishop ............... 297/129 |

FOREIGN PATENT DOCUMENTS

| | | |
|---|---|---|
| GB | 1.455.114 | 11/1976 |
| JP | 7308219 | 11/1995 |
| JP | 11059427 | 3/1999 |
| JP | 2004042761 | 2/2004 |
| WO | WO 9816416 A1 * | 4/1998 |

* cited by examiner

*Primary Examiner*—Christopher P Ellis
*Assistant Examiner*—John D Walters
(74) *Attorney, Agent, or Firm*—Michael I Kroll (57) ABSTRACT

An apparatus for retaining and transporting baggage comprising a selectively mobile structure having a guide handle for controlling movement thereof and means for moving the structure connected at an end opposite the guide handle. A first platform is connected at an end opposite the guide handle and adjacent to the moving means for retaining baggage thereon. A second platform is pivotally connected to the structure at a point substantially equidistant from the guide handle and the first platform. A supporting mechanism is pivotally connected to an underside of THE second platform for supporting THE second platform against a surface. Upon pivoting the second platform about a pivot point, the second platform moves from a first position parallel to the structure to a second position perpendicular to the structure. The support means pivots and is parallel to the structure and engages the surface to support a predetermined amount of weight resting on the second platform while simultaneously retaining any baggage on the first platform.

17 Claims, 9 Drawing Sheets

COMBINATION BAGGAGE TOTE AND POSTURE CHAIR

BACKGROUND OF THE INVENTION

1. Field of the Invention

The present invention relates generally to transporting objects and, more specifically, to a device specially suited for easily transporting baggage and simultaneously providing a seat for a user. The device includes a platform for retaining baggage and a seat having an adjustable height. A plurality of support legs are connected to an underside of the seat and provide for added stability for the seat. The seat is moveable along a track to provide additional support in retaining baggage of different sizes. The device also includes a handle and wheels for easy maneuverability and is able to be compacted for easier storage.

2. Description of the Prior Art

There are other transporting devices designed for carrying baggage. Typical of these is U.S. Pat. No. 2,377,815 issued to Sides et al. on Jun. 5, 1945.

Another patent was issued to Coupe on Apr. 14, 1970 as U.S. Pat. No. 3,506,280 another U.S. Pat. No. 3,997,213 was issued to Smith et al. on Dec. 14, 1976 and still yet another was issued on Sep. 22, 1981 to Barriere as U.S. Pat. No. 4,290,625.

Another patent was issued to Suchy on Apr. 6, 1982 as U.S. Pat. No. 4,323,260. Yet another U.S. Pat. No. 4,733,905 was issued to Buikerood, et al. on Mar. 29, 1988. Another was issued to King on Apr. 25, 1989 as U.S. Pat. No. 4,824,167 and still yet another was issued on Nov. 5, 1991 to Chang as U.S. Pat. No. 5,062,650.

Another patent was issued to Said on Nov. 30, 1993 as U.S. Pat. No. 5,265,892. Yet another U.S. Pat. No. 5,669,659 was issued to Dittmer on Sep. 23, 1997. Another was issued to Krulik on Sep. 28, 1999 as U.S. Pat. No. 5,957,349 and still yet another was issued on Nov. 10, 1976 to Hamel as U.K. Patent No. GB 1455114.

Another patent was issued to Tadao on Nov. 28, 1985 as Japanese. Patent No. JP7308219. Yet another Japanese Patent No. JP11059427 was issued to Kazuo on Mar. 2, 1999. Another was issued to Iwao on Feb. 12, 2004 as Japanese Patent No. JP2004042761.

U.S. Pat. No. 2,377,815

Inventor: Sides et al.

Issued: Jun. 5, 1945

In a cart, a pair of relatively long upwardly and rearwardly inclined side bars, a pair of relatively short upwardly and forwardly inclined side bars pivotally connected scissors fashion to the long side bars, supporting wheels adjacent the lower ends of the side bars, a cross rod at the upper ends of the long side bars, which cross rod forms the handle of the cart and also serves as one of two complementary hand-grip portions which upon being squeezed together act to collapse the cart, a lower basket carrying shelf pivotally supported at one end by one of the pairs of side bars, a stop on the other pair of side bars on which the other end of the shelf is supported with the shelf in a substantially horizontal position, toggle links connecting the shelf with the last mentioned side bars for causing the free end of the shelf to swing upwardly into a collapsed position when the short side bars are swung about their pivots into substantially the plane of the long side bars, an upper basket carrying shelf pivotally supported adjacent its rear end by the upper ends of the short side bars, a stop on the long side bars under which the rear end of the upper shelf is engaged with the shelf in a substantially horizontal position, and a cross rod on the front end of the upper shelf, which cross rod is spaced forwardly from the other portions of the upper shelf to leave a hand opening and serves as the other of said hand-grip portions in collapsing the cart, the upper shelf being freely tiltable into an inverted position in which the cross rod on the front end of the same is disposed within convenient one hand gripping distance of the cross rod at the upper ends of the long side bars, said two hand-grip portions upon being gripped from opposite sides and squeezed together acting to draw upwardly and rearwardly the upper forwardly projecting ends of the short side bars and bring about complete collapse of the cart.

U.S. Pat. No. 3,506,280

Inventor: Coupe

Issued: Apr. 14, 1970

In combination with a golf cart or the like having a wheel-equipped frame structure, a removable and foldable seat assembly comprising a seat-defining platform equipped with leg structure pivotally secured along the underside of the platform for movement with respect thereto between a folded position in which the leg structure extends generally along the platform and an open position in which the leg structure is generally normal thereto, a bearing fixedly secured to said frame structure, a support arm removably carried by said bearing for swinging movements with respect thereto, means along the underside of said platform pivotally supporting said arm for movement relative thereto between such folded and open positions, and linkage interconnecting said arm and leg structure for enforcing concurrent movements thereon relative to said platform, interconnection of said arm and bearing being the only attachment of said seat assembly to said cart so that said seat assembly can be separated from and attached to said cart by selectively removing said arm from and connecting it with said bearing.

U.S. Pat. No. 3,997,213

Inventor: William Q. Smith et al.

Issued: Dec. 14, 1976

Tubular assemblies are interpivotally connected so as to form a stable seat when the assemblies are pivoted into an expanded position but form a wheeled carryall when in the collapsed position. One assembly cooperates with the other assemblies to provide a seat back when in the expanded position and likewise provides a gripping handle for manual movement when the assemblies are in the collapsed position. A second of the assemblies has wheels attached thereto which are pivoted out of engagement with the surface when in the expanded position but pivoted so as to provide wheeled engagement with the surface when the assemblies are interpivotally collapsed. The third assembly cooperates with the wheeled assembly to provide the seating arrangement in the expanded configuration and the carryall portion when in the collapsed configuration.

U.S. Pat. No. 4,290,625

Inventor: Alain Barriere

Issued: Sep. 22, 1981

A foldable baggage carrying device is disclosed which has relatively moveable frame members which enable the device to be convertible into multiple position for different uses. When used as a baggage carrier a second frame member is moved into position as an extension of the first frame member and baggage is carried on a baggage support at the bottom of the first frame member. The second frame member includes a seat unit and seat back so that if desired a user can place a support or prop on the ground so that the second frame member will be perpendicular to the first frame member to form a seat. If it is desired to carry the unit without baggage, the frame elements are moved into an inoperative position such that the support and both frame members are collapsed and locked together. This results in a compact and easy to carry unit.

U.S. Pat. No. 4,323,260

Inventor: Adalbert W. Suchy

Issued: Apr. 6, 1982

A folding chair and cart structure having an upright frame and a transverse member pivoted thereto, one end of the transverse frame forming a seat portion and the other end extending beyond the upright frame and carrying a pair of wheels, a sheet of canvas secured to the upright and transverse frames to form a seat and a track for removable engagement with the wheels. The structure functions as a cart by merely tilting the upright frame to a horizontal position and the entire structure is foldable into a compact unit for transport and storage.

U.S. Pat. No. 4,733,905

Inventor: Kenneth N. Buickerood

Issued: Mar. 29, 1988

A two-wheeled vehicle which can be collapsed into a fully compact, retracted condition or expanded into any one of a number of different forms including the form of a cart, a chair or seat and a two-wheeled carrier for an elongated object, such as a two-wheeled carrier for an elongated object, such as a surfboard. The vehicle has an axle provided with a pair of wheels at the opposed ends thereof. First and second U-shaped elements are pivotally connected to the shaft near respective wheels. A flexible sheet is mounted on and extends between the crosspieces of the first and second elements. Third and fourth U-shaped elements are pivotally coupled intermediate their ends on respective first and second elements, and the positions of these third and fourth elements determine the form in which the unit is to assume. A locking bar near each mounting plate frictionally engages the fourth element to releasably lock the latter in its operative position so that the fourth element forms the handle of a cart. Adjustments of the third and fourth elements from the cart locations thereof permits the unit of the present invention to be converted from the cart to a chair and from the chair to a two-wheeled carrier.

U.S. Pat. No. 4,824,167

Inventor: Mynor King

Issued: Apr. 25, 1989

A combination device disposable in an unfolded position for use wherein it may function as a conventional; or fishing chair, and in a folded position for use as a baggage carrier. The device is defined by a pair of U-shaped metal tubular members which are pivotally connected together, with one member having a pair of legs provided with wheels and angled end portions. The end portions engage the ground in the unfolded position and the wheels engage the ground in the folded position. The other member includes a U-shaped portion which functions as a chair back in the unfolded position and a handle in the folded position. A flexible seat with attached storage pocket, fishing pole support bracket and article support rack are also provided.

U.S. Pat. No. 5,062,650

Inventor: C. I. Chang

Issued: Nov. 5, 1991

A multi-function chair comprising a fore and a hind leg pivotally combined together and adapted to be altered to become a chair or a light duty truck or to be folded up to become a small dimension for storing away.

U.S. Pat. No. 5,265,892

Inventor: Brian R. Said

Issued: Nov. 30, 1993

The flexible cargo container of this cart partially deflects inside-out as the cart truss supporting it changes orientation pivoting on wheels rotatably mounted at the aft lower extremity of downwardly projecting support struts to serve as a chair. Leg supports providing static stability are pivotably mounted to extend forward thereby resisting tipping moments about the wheel axle with payload located intermediate thereto. Rotation of the forward end of the cart upwardly and rearwardly brings the rearward upper connect strut in contact with the support surface exposing the underside of the flexible container inverted to concavity, resulting in a chair of supine positioning. Support struts making up the truss fold about pivotable connections yielding a non-use flat geometry for storage. Snap releasable interconnections dissociate struts from the truss in further disassembly.

U.S. Pat. No. 5,669,659

Inventor: Thomas E. Dittmer

Issued: Sep. 23, 1997

A platform assembly and wheel assembly for retrofitting a folding chair to form a combination chair and hand truck. The platform assembly is removably attached to the bottom section of the pair of leg members forming the front legs of the folding chair. Similarly, the wheel assembly is removably attached to the bottom section of the pair of load support members forming the back legs of the folding chair. The wheel assembly includes a plurality of brackets for removably attaching the wheel assembly to the pair of upright support members, an axle fixedly attached to the plurality of brackets, and a pair of wheels rotatably connected to opposite ends of the axle. The platform assembly includes a lift member, a transverse platform and a plurality of elongated right and left channels extending vertically from the lift member or clamps for removably attaching the platform assembly to the front legs of the folding chair. When the combination chair and hand truck is folded in an open position, it will function as a chair. When the combination chair and hand truck is folded in a closed position, it will function as a hand truck.

U.S. Pat. No. 5,957,349

Inventor: Richard J. Krulik

Issued: Sep. 28, 1999

A combination article of baggage seat unit is disclosed, in which the seat unit may be completely separated from the baggage when it is desired to use the seat and when in its storage condition is compactly contained within an auxiliary compartment of the article of baggage. The seat unit may also be used while it is connected to the baggage, with a portion of the baggage re-positioned to provide a cushion of for the seat, and is secured to a planar support member for the emplacement of the seat unit within the article of baggage.

U.K. Patent Number GB1455114

Inventor: Theodore Hamel

Issued: Nov. 23, 1972

A push chair having a longitudinally collapsible chassis is provided with a seat 40 and seat support frame 24 which are pivoted upwardly during collapse, the chassis side frames 10, 11 being collapsed by pivotal movement of the handle frame 29. Each side frame includes members 12, 13 pivotally interconnected at 14 which mount the wheel axles 15, 19, seat frame 24 and handle 29. The frame 24 is also pivoted to an arm 26 pivotally mounted on a vertical member 23 at each side of the chassis and which is pivoted at 21 and 30 respectively to the member 12 and handle frame 29. On downward pivoting of the handle frame members 12, 13 and frame 24 are moved towards members 23 along with the seat which is supported by a strap and buckle 43, 46 on the frame 24. A baggage support platform 47 is mounted on members 23 and pivotally mounted trailing arms 20 support the rear wheel axle (FIG. 2, not shown) and brake levers (54) equipped with brake shoes 56.

Japanese Patent Number JP7308219

Inventor: Takeuchi Tadao

Issued: Nov. 28, 1995

PURPOSE: To easily assemble a chair for sitting thereon by using the lower end of a handle as a rear leg, housing all of a seat, a front leg and a lateral batten within the same plane as the handle during the non-use of the chair, and pulling out the seat, the front leg and the batter toward the back of the handle at the time of using the chair.

CONSTITUTION: A seat 5, a front leg 6 and a lateral batten 7 are provided as the constituent members of a chair 8, and the lower end of the vertical pipe 10 of a handle 1 is also used as the rear leg 4 of the chair 8 in common. The seat 5 has one end rotatably connected to the front leg 6 and the other end rotatably connected to a slider 13. At the time of carrying a baggage, the slider 13 is moved and kept at the upper section of the vertical pipe 10. In this case, the seat 5 is lifted with the slider 13, and the seat 5, the front leg 6 and the batten 7 come to be positioned along the same linear line. Then, when the slider 13 is moved to the lower section of the handle 1, the seat 5 becomes vertical to the handle 1 and the front leg 6 also becomes vertical to the seat 5. In addition, the batten 7 also becomes vertical to the handle 1 and the front leg 6. As a result, the chair 8 directed backward can be assembled.

Japanese Patent Number JP11059427

Inventor: Kimura Kazuo

Issued: Mar. 2, 1999

PROBLEM TO BE SOLVED: To provide a folding pushcart having excellent design, high easiness to use and safety with which a user can smoothly convey baggage during walking or shopping, and on which the uses can sit for rest.

SOLUTION: A chair composing a pushcart is directed to the rear side, differently from the conventional case. A seat surface, as cover of a baggage housing part, can be opened from the rear side. A handle 15 is attached to the front side of the pushcart, rotatably around the attaching part. A locking device is arranged for locking the rotation of the handle 15 at a proper position.

Japanese Patent Number JP2004042761

Inventor: Sekizaki Iwao

Issued: Feb. 12, 2004

PROBLEM TO BE SOLVED: To provide a carry cart which is used for a cart by placing a baggage on a deck part of a leg body, used for a chair by seating on a seat part of the leg body, and used for a pack frame by placing the baggage on the deck part and carrying a back-carrying part on the back, folds the leg body by a folding mechanism when not in use, and enhances the flexibility of applications, the portability and the convenience of multi-purpose applications such as camping and fishing.

SOLUTION: A wheel 3 is disposed on a support frame 1, a leg body 4 which is also used for a deck part M and a seat part S is disposed in a folding manner by a folding mechanism 5, and a back-carrying part 6 is disposed on the support frame.

SUMMARY OF THE PRESENT INVENTION

The present invention relates generally to transporting objects and, more specifically, to a device specially suited for easily transporting baggage and simultaneously providing a seat for a user. The device includes a platform for retaining baggage and a seat having an adjustable height. A plurality of support legs are connected to an underside of the seat and provide for added stability for the seat. The seat is moveable along a track to provide additional support in retaining baggage of different sizes. The device also includes a handle and wheels for easy maneuverability and is able to be compacted for easier storage.

A primary object of the present invention is to provide a seated baggage carrier that overcomes the shortcomings of the prior art.

A secondary object of the present invention is to provide a seated baggage carrier able to accommodate a plurality of different types of baggage.

Another object of the present invention is to provide a seated baggage carrier that provides a user with a seat.

Still another object of the present invention is to provide a seated baggage carrier that is collapsible for storage purposes.

Yet another object of the present invention is to provide a seated baggage carrier having a handle.

Another object of the present invention is to provide a seated baggage carrier wherein the handle is extendable and retractable.

Still yet another object of the present invention is to provide a seated baggage carrier having a back support.

Yet another object of the present invention is to provide a seated baggage carrier wherein the back support is pivotally fastened.

Another object of the present invention is to provide a seated baggage carrier wherein the back support is padded with additional lumbar support.

Yet another object of the present invention is to provide a seated baggage carrier having legs attached to the seat.

Another object of the present invention is to provide a seated baggage carrier wherein the legs are extendable and retractable.

Still yet another object of the present invention is to provide a seated baggage carrier wherein a tension exists to keep the legs in an extended or retracted position.

Yet another object of the present invention is to provide a seated baggage carrier wherein the tensioned legs aid in retaining the baggage on the platform.

Still another object of the present invention is to provide a seated baggage carrier wherein the legs traverse along a track under the seat to accommodate baggage of various thickness.

Still another object of the present invention is to provide a seated baggage carrier that is simple and easy to use.

Still yet another object of the present invention is to provide a seated baggage carrier that is inexpensive to manufacture and operate.

Additional objects of the present invention will appear as the description proceeds.

The present invention overcomes the shortcomings of the prior art by providing a seated baggage carrier having telescopic poles that may be expanded or contracted in across a substantially vertical plane to adjust the height of the handle, back pad and seat. The bottom of the carrier includes a base, fitted with wheels and a baggage platform for the placement of baggage thereon. A plurality of fold-out support bars are mounted to the bottom of the seating platform. The support bars are connected via a track providing additional support to the seat platform while in use or to serve as retaining elements for baggage held on the baggage platform.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the seated baggage carrier of the present invention. With regard to the reference numerals used, the following numbering is used throughout the various drawing Figures.

10 Seated baggage carrier of the present invention
12 user
14 toting handle
16 back pad
18 lumbar support
20 first telescopic pole
22 first adjustment element
24 seat platform
28 support legs
30 wheels
32 baggage platform
34 baggage
36 tension spring
38 seat top
40 seat bottom
42 roller
44 track
46 leg lock
48 lock spring
50 leg lock arrow
52 leg arrow
54 spring tensioned
56 first bottom
58 second bottom
60 second adjustment element
62 first side of telescopic pole
64 second side of telescopic pole
66 second telescopic pole
68 second pole base 70 left side of seat
72 right side of seat
74 leg top
76 post
78 first end tension spring
80 second end tension spring
82 front of seat bottom
84 first directional arrow
86 second directional arrow
88 tilt directional arrow

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 9 illustrate a seated baggage carrier of the present invention which is indicated generally by the reference numeral 10.

Figure 1:
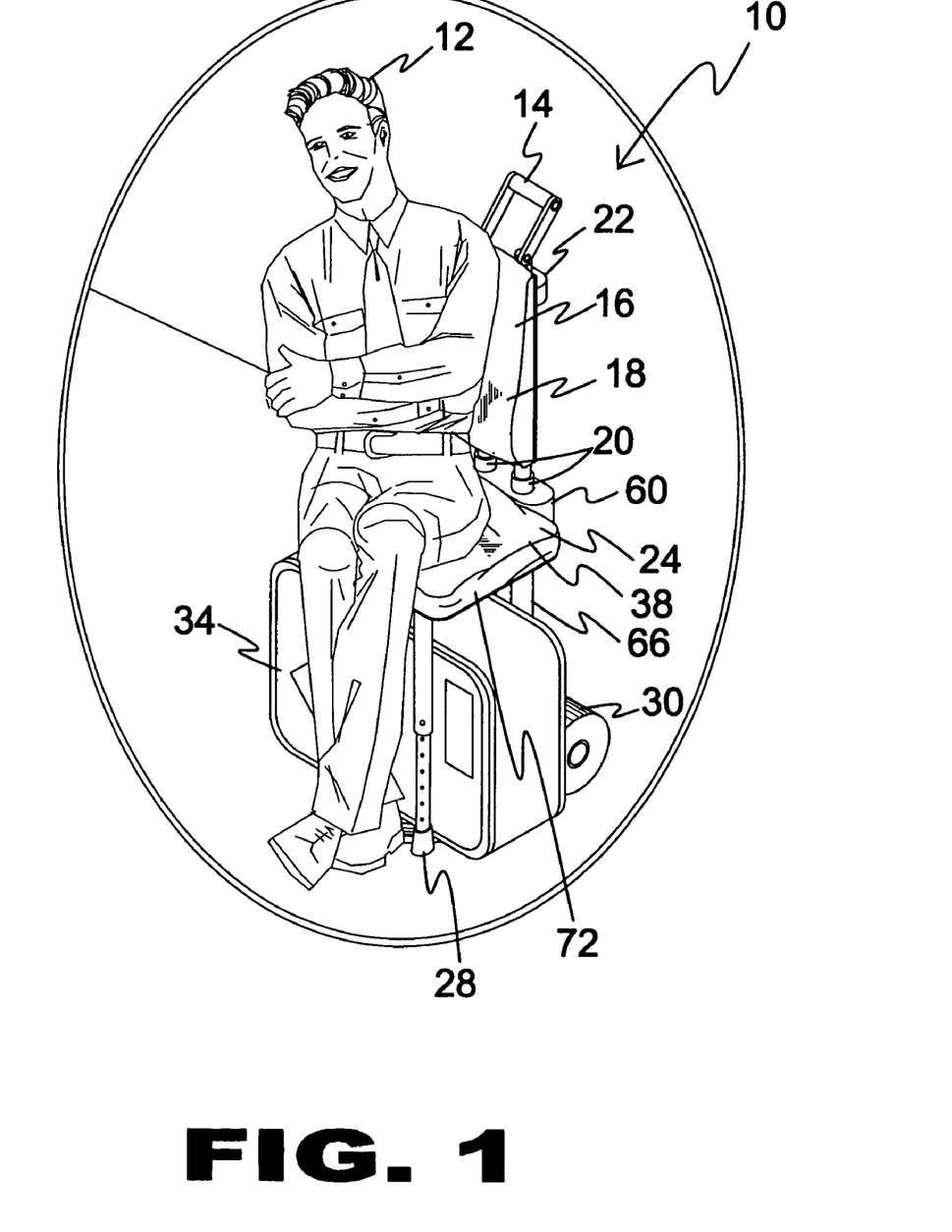
FIG. 1 is an illustrative view of the seated baggage carrier of the present invention in use.
Figure 2:
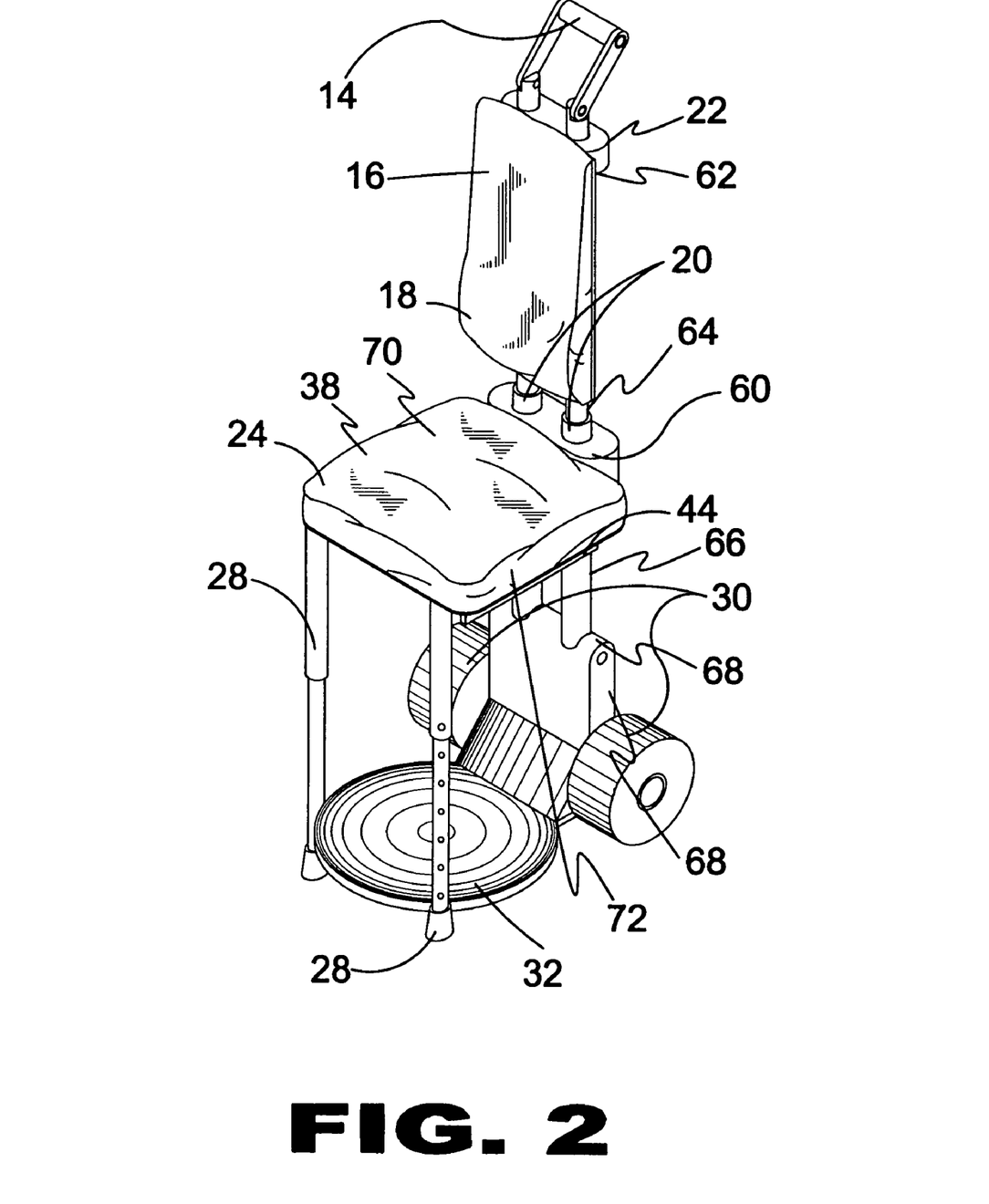
FIG. 2 is a perspective view of the seated baggage carrier of the present invention.

FIG. 1 is an illustrative view of the seated baggage carrier 10 of the present invention in use. The seated baggage carrier 10 includes a toting handle 14 attached to a first side 62 of a pair of first telescopic poles 20 via a first adjustment element 22. A second side 64 of the pair of first telescopic poles 20 is attached to a second adjustment element 60. A back pad 16 is pivotally attached to the first adjustment element 22. Shown herein, the back pad 16 is rectangular in shape. However, the back pad 16 may be made in a plurality of geometric shapes to support a user's 12 back. Extending from the second adjustment element 60 to a second pole base 68, shown in FIG. 2, is a pair of second telescopic poles 66. A plurality of wheels 30 are connected to the second pole base 68 via an axel passing therethrough.

A seat platform 24 is connected to the second adjustment element 60. The seat platform 24 has a seat top 38, a seat bottom 40, a left side 70 and a right side 72, which will be discussed in more detail with specific reference to FIG. 4. Shown herein, the seat platform 24 is rectangular in shape. However, the seat platform 24 may be made in a plurality of geometric shapes to provide a place for the user 12 to sit. When the seat platform 24 is fully extended, a right angle is formed between the seat platform 24 and the back pad 16. A baggage platform 32, shown in FIG. 2, extends horizontally from the second pole base 68 and is parallel with the seat platform 24, when the seat platform 24 is fully extended. A pair of support legs 28 extend vertically from the seat bottom 40, one on each of the left side 70 and the right side 72. The support legs 28 are extendible and tensioned to help keep baggage 34 on the baggage platform 32, as will be later discussed in more detail with specific reference to FIG. 4.

Shown herein, a user 12 is sitting on the seat top 38 of the seat platform 24. The user rests his back on the back pad 16. The back pad 16 may include a lumbar support 18 for more comfortable sitting. The baggage 34 rests on the baggage platform 32, shown in FIG. 2. The support legs 28 are extended and support to the seat platform 24. The support legs 28 also provide tension to assist in keeping the baggage 34 on the baggage platform 32. The tension applied to the baggage 34 causes the baggage 34 to be retained on the platform 32 and between the legs 28 and second telescopic poles 66.

The seated baggage carrier of the present invention is advantageous in that it provides the option of selectively adjusting the seat platform 24 and back pad 16 of the seated baggage carrier 10. The seat platform 24 can be adjusted vertically along the second telescopic pole 66 and the back pad can be adjusted vertically along the first telescopic pole 20 to adjust for users of different heights. The seated baggage carrier 10 is usable at any given time during transit or after arrival at a destination. The tensioned legs 28 additionally serve as retaining members for the baggage 34.

FIG. 2 is a perspective view of the seated baggage carrier 10 of the present invention. The seated baggage carrier 10 includes the toting handle 14, attached to the first side 62 of the pair of first telescopic poles 20 via the first adjustment element 22. The second side 64 of the pair of first telescopic poles 20 is attached to the second adjustment element 60. The back pad 16 is pivotally attached to the first adjustment element 22. Shown herein, the back pad 16 is rectangular in shape. However, the back pad 16 may be made in a plurality of geometric shapes to support the user's 12 back. The pair of second telescopic poles 66 extends between the second adjustment element 60 and the second pole base 68. The plurality of wheels 30 are connected to the second pole base 68. Shown herein, an axle passes transversely through the second pole base 68. Each wheel 30 is attached to each end of the axle and rotates thereabout. However, use of the axle as a connector is for purposes of example only, and other connectors may be used.

The seat platform 24 is connected to the second adjustment element 60. The seat platform 24 has the seat top 38, the seat bottom 40, the left side 70 and the right side 72, which will be discussed in more detail with specific reference to FIG. 4. Shown herein, the seat platform 24 is rectangular in shape. However, the seat platform 24 may be made in a plurality of geometric shapes to provide a place for the user 12 to sit. When the seat platform 24 is fully extended, a right angle is formed between the seat platform 24 and the back pad 16. The baggage platform 32 extends horizontally from the second pole base 68 and is parallel with the seat platform 24, when the seat platform 24 is fully extended. The pair of support legs 28 extends vertically from the seat bottom 40, one on each of the left side 70 and the right side 72. The support legs 28 are extendible and tensioned to help keep baggage 34, shown in FIG. 3, on the baggage platform 32, as will be later discussed in more detail with specific reference to FIG. 4. On the seat bottom 40, a track 44 runs along each of the left side 70 and the right side 72. The support legs 28 are moveable along the length of the track 44 to accommodate baggage 34 of various thickness.

Figure 3:
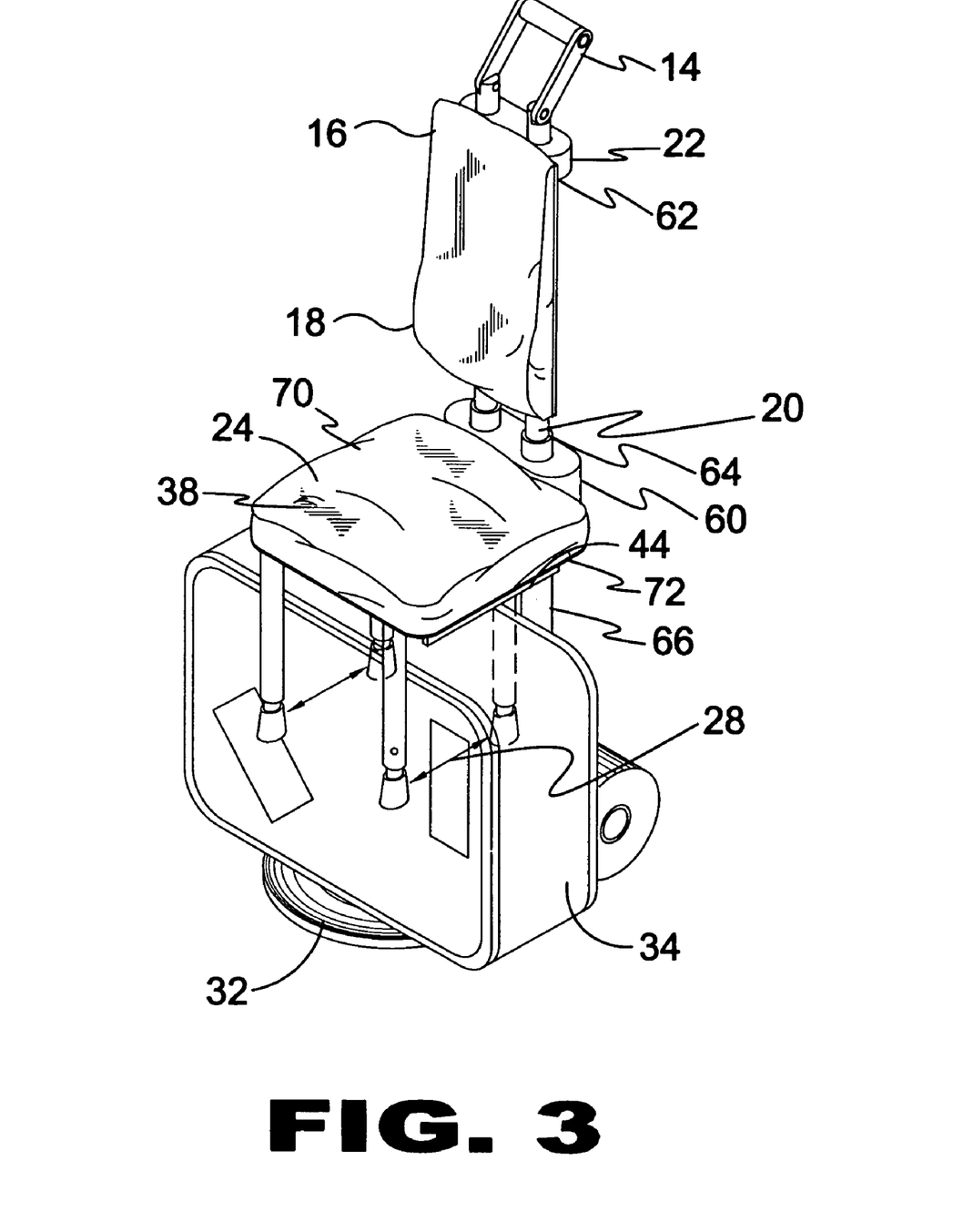
FIG. 3 is a perspective view of the seated baggage carrier of the present invention.

FIG. 3 is a perspective view of the seated baggage carrier 10 of the present invention. The seated baggage carrier 10 includes the toting handle 14, attached to the first side 62 of the pair of first telescopic poles 20 via the first adjustment element 22. The second side 64 of the pair of first telescopic poles 20 is attached to the second adjustment element 60. The back pad 16 is pivotally attached to the first adjustment element 22. Shown herein, the back pad 16 is rectangular in shape. However, the back pad 16 may be made in a plurality of geometric shapes to support the user's 12 back. The pair of second telescopic poles 66 connects the second adjustment element 60 to the second pole base 68, shown in FIG. 2. The plurality of wheels 30 are connected to the second pole base 68. Shown herein, an axle passes transversely through the second pole base 68. Each wheel 30 is attached to each end of the axle and rotates thereabout. However, use of the axle as a connector is for purposes of example only, and other connectors may be used.

The seat platform 24 is connected to the second adjustment element 60. The seat platform 24 has the seat top 38, the seat bottom 40, the left side 70 and the right side 72, which will be discussed in more detail with specific reference to FIG. 4. Shown herein, the seat platform 24 is rectangular in shape. However, the seat platform 24 may be made in a plurality of geometric shapes to provide a place for the user 12 to sit. When the seat platform 24 is fully extended, it forms a right angle with the back pad 16. The baggage platform 32 extends horizontally from the second pole base 68 so that it is parallel with the seat platform 24, when the seat platform 24 is fully extended. The pair of support legs 28 extends vertically from the seat bottom 40, one on each of the left side 70 and the right side 72. Shown herein, the support legs 28 are not fully extended. The support legs 28 are tensioned to help keep the baggage 34 on the baggage platform 32, as will be later discussed in more detail with specific reference to FIG. 4. On the seat bottom 40, the track 44 runs along each of the left side 70 and the right side 72. The support legs 28 are movable along the length of the track 44 to accommodate baggage 34 of various thickness.

Figure 4:
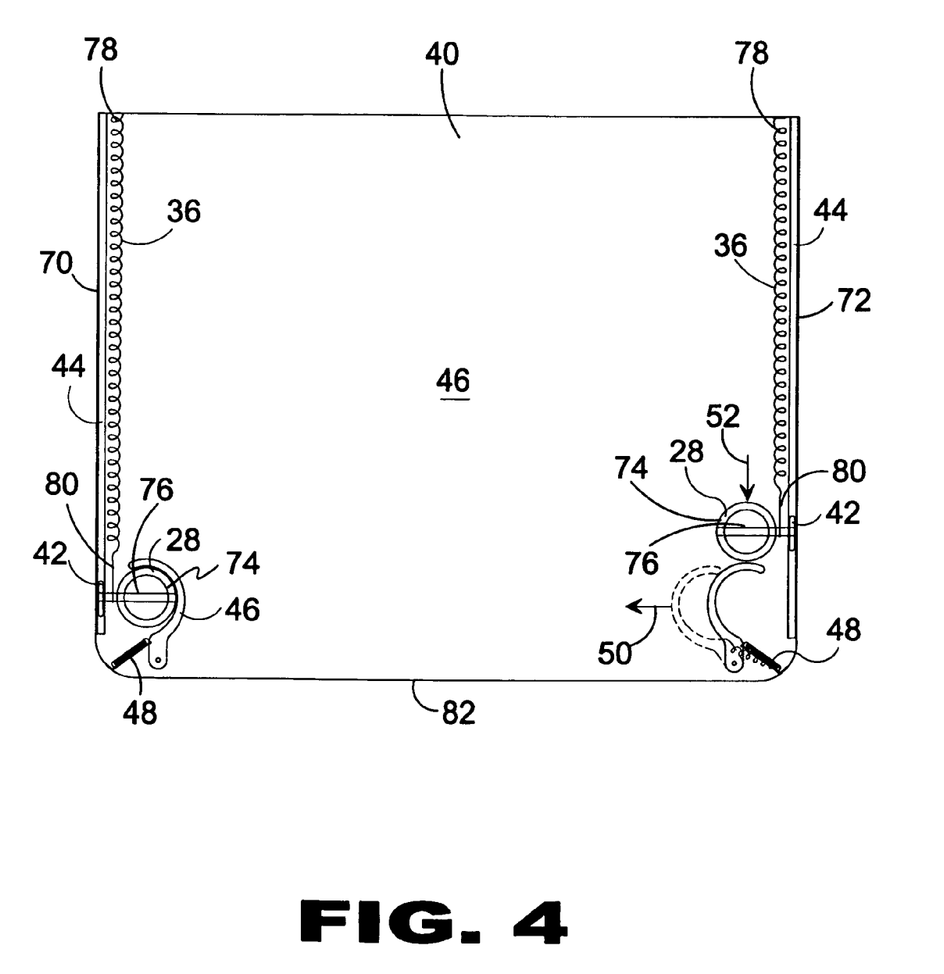
FIG. 4 is a perspective view of the bottom of the seat of the seated baggage carrier of the present invention.

FIG. 4 is a view of the seat bottom 40 of the seated baggage carrier 10 of the present claimed invention. The seat platform 24 is connected to the second adjustment element 60, shown in FIG. 2. The seat platform 24 has the seat top 38, the seat bottom 40, the left side 70 and the right side 72. Shown herein, the seat platform 24 is rectangular in shape. However, the seat platform 24 may be made in a plurality of geometric shapes to provide a place for the user 12 to sit. When the seat platform 24 is fully extended, it forms a right angle with the back pad 16. Each leg 28 is pivotally attached via a post 76 to a front 82 of the seat bottom 40, thereby allowing each leg 28 to fold up against the seat bottom 40, at either the right side 72 or the left side 70. Each leg 28 includes a leg top 74. The post 76 passes transversely through the leg top 74. The exposed end of the post 76 is attached to a roller 42. The roller 42 traverses the track 44 that runs along each of the left side 70 and the right side 72 of the seat bottom 40. A tension spring 36 runs parallel to each track 44. At a first end 78, the tension spring 36 is attached to the second adjustment element 60. At the second end 80, the tension spring 36 is attached to the post 76, between the roller 42 and the leg 28. A leg lock 46 is located in each corner of the front 82 of the seat bottom 40. Shown herein, the leg lock 46 is shaped like a "question mark." A lock spring 48 is attached at one end to the leg lock 46 and at another end to the seat bottom 40.

The leg lock 46 holds the leg 28 in the extended position. When the leg 28 is extended, the tension spring 36 is stretched along the track 44, thereby creating tension. To engage the leg lock 46 around the leg 28, the lock spring 48 allows the leg lock 46 to pivot until it slips around the leg 28 and maintains the extended position of the leg 28. When the leg lock 46 is moved to disengage the leg 28, the tension in the tension spring 36 is released thereby causing the tension spring 36 to recoil. As the tension spring 36 recoils, the leg 28 moves with the tension spring 36 via the roller 42 and retains any article, such as baggage 34, placed between the first end 78 and the second end 80 of the tension spring 36.

Figure 5:
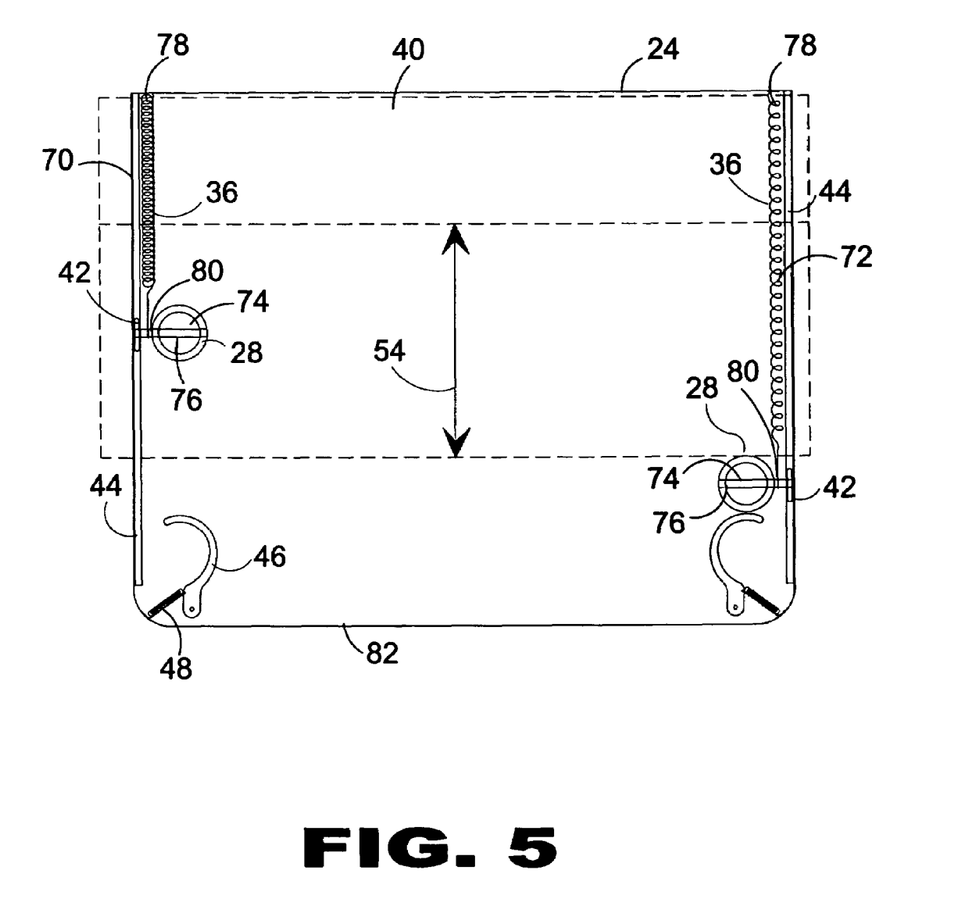
FIG. 5 is a perspective view of the bottom of the seat of the seated baggage carrier of the present invention.

FIG. 5 is a perspective view of the seat bottom 40 of the seated baggage carrier 10 of the present claimed invention. The seat platform 24 is connected to the second adjustment element 60, shown in FIG. 2. The seat platform 24 has the seat top 38, the seat bottom 40, the left side 70 and the right side 72. Shown herein, the seat platform 24 is rectangular in shape. However, the seat platform 24 may be made in a plurality of geometric shapes to provide a place for the user 12 to sit. When the seat platform 24 is fully extended, a right angle is formed between the seat platform 24 and the back pad 16. Each leg 28 is pivotally attached via the post 76 to the front 82 of the seat bottom 40, thereby allowing each leg 28 to fold up against the seat bottom 40, at either the right side 72 or the left side 70. Each leg 28 includes the leg top 74. The post 76 passes transversely through the leg top 74. The exposed end of the post 76 is attached to the roller 42. The roller 42 traverses the track 44 that runs along each of the left side 70 and the right side 72 of the seat bottom 40. The tension spring 36 runs parallel to each track 44. At the first end 78, the tension spring 36 is attached to the second adjustment element 60. At the second end 80, the tension spring 36 is attached to the post 76, between the roller 42 and the leg 28. The leg lock 46 is located in each corner of the front 82 of the seat bottom 40. Shown herein, the leg lock 46 is shaped like a "question mark." The lock spring 48 is attached at one end to the leg lock 46 and at another end to the seat bottom 40.

The leg lock 46 holds the leg 28 in the extended position. When the leg 28 is extended, the tension spring 36 is stretched along the track 44, thereby creating tension. To engage the leg lock 46 around the leg 28, the lock spring 48 allows the leg lock 46 to pivot until it slips around the leg 28 and maintains the extended position of the leg 28. When the leg lock 46 is moved to disengage the leg 28, the tension in the tension spring 36 is released thereby causing the tension spring 36 to recoil. As the tension spring 36 recoils, the leg 28 moves with the tension spring 36 via the roller 42 and retains any article, such as baggage 34, placed between the first end 78 and the second end 80 of the tension spring 36.

Shown herein, the tension spring 36 on the left side 70 has been released by the leg lock 46. The tension spring 36 on the left side 70 has recoiled thereby causing the leg 28 to move along the track 44 via the roller 42. The tension spring on the right side 72 has not recoiled. The difference in force between the tension spring 36 on the left side 70 and the tension spring 36 on the right side 72 is represented by a spring tensioned arrow 54.

Figure 6:
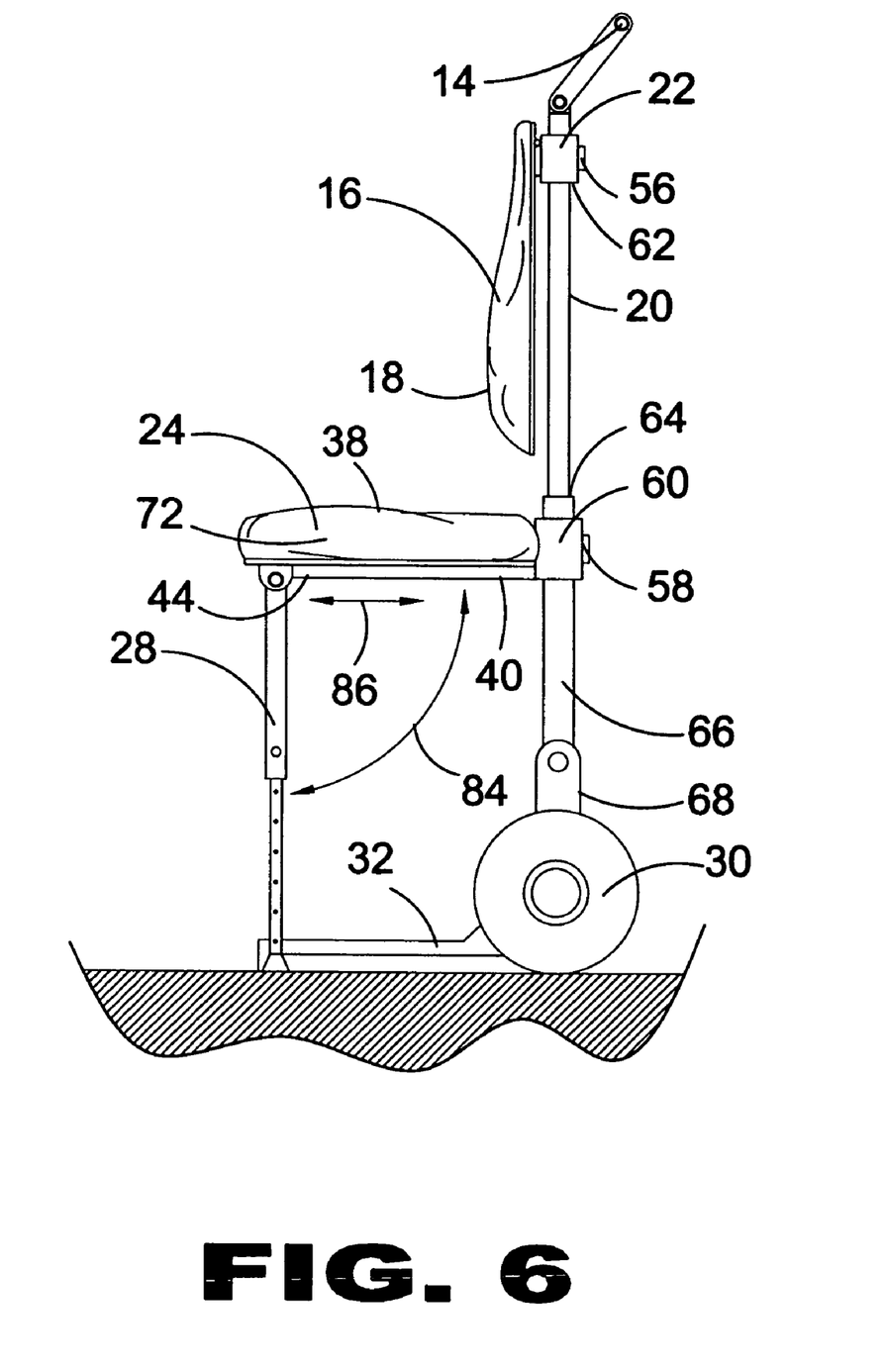
FIG. 6 is a perspective view of the side of the seated baggage carrier of the present invention.

FIG. 6 is a side view of the seated baggage carrier 10 of the present invention. The seated baggage carrier 10 includes the toting handle 14, attached to the first side 62 of the pair of first telescopic poles 20 via the first adjustment element 22. A first button 56 is attached to the first adjustment element 22. Depression of the first button 56 initiates moving of the first adjustment element 22, which allows for customizable height level of the pair of first telescopic poles 20. The second side 64 of the pair of first telescopic poles 20 is attached to the second adjustment element 60. A second button 58 is attached to the second adjustment element 60. Depression of the second button 58 initiates moving of the second adjustment element 60, which allows for customizable height level of the pair of second telescopic poles 66. The back pad 16 is pivotally attached to the first adjustment element 22. Shown herein, the back pad 16 is rectangular in shape. However, the back pad 16 may be made in a plurality of geometric shapes to support the user's 12 back. The pair of second telescopic poles 66 connects the second adjustment element 60 to the second pole base 68. The plurality of wheels 30 are connected to the second pole base 68, as discussed above with specific reference to FIG. 2.

The seat platform 24 is connected to the second adjustment element 60. The seat platform 24 has the seat top 38, the seat bottom 40, the left side 70 and the right side 72, discussed above with specific reference to FIG. 4. Shown herein, the seat platform 24 is rectangular in shape. However, the seat platform 24 may be made in a plurality of geometric shapes to provide a place for the user 12 to sit. When the seat platform 24 is fully extended, a right angle is formed between the seat platform 24 and the back pad 16. The baggage platform 32 extends horizontally from the second pole base 68 and is parallel with the seat platform 24, when the seat platform 24 is fully extended.

Shown herein, the pair of support legs 28 have a telescoping property, thereby allowing their length to be altered. The pair of support legs 28 fold out from the seat bottom 40 as shown by a first directional arrow 84 to extend vertically from the seat bottom 40, one on each of the left side 70 and the right side 72. The support legs 28 are tensioned to help keep baggage 34, shown in FIG. 3, on the baggage platform 32, as discussed above with specific reference to FIG. 4. On the seat bottom 40, the track 44 runs along each of the left side 70 and the right side 72. The support legs 28 traverse along the track 44 to accommodate baggage 34 of various thickness, as indicated by a second directional arrow 86. In the embodiment shown herein, the support legs 28 are selectively extendible along a vertical axis.

Figure 7:
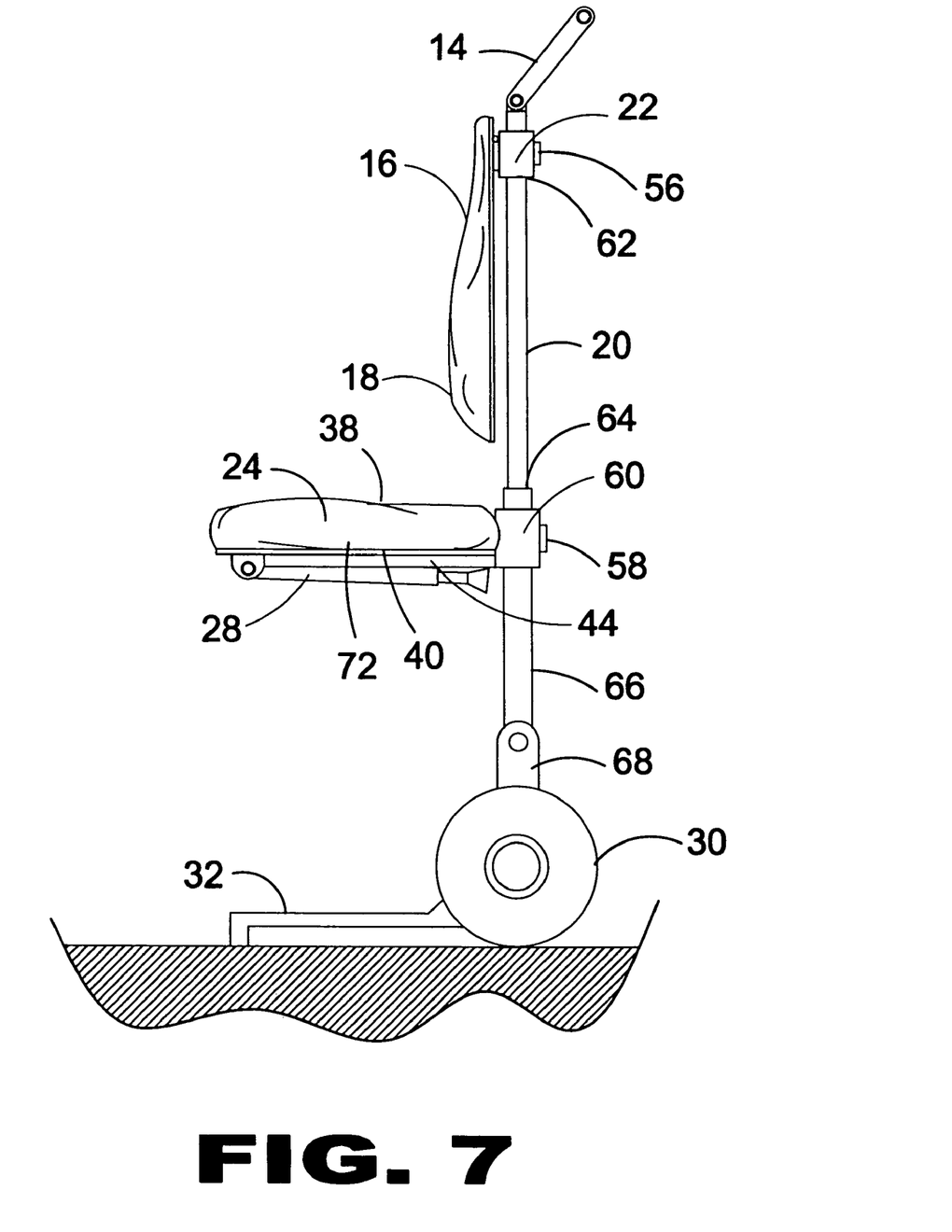
FIG. 7 is a perspective view of the side of the seated baggage carrier of the present invention.

FIG. 7 is a perspective view of the side of the seated baggage carrier 10 of the present invention. The seated baggage carrier 10 includes the toting handle 14, attached to the first side 62 of the pair of first telescopic poles 20 via the first adjustment element 22. The first button 56 is attached to the first adjustment element 22. Depression of the first button 56 initiates moving of the first adjustment element 22, which allows for customizable height level of the pair of first telescopic poles 20. The second side 64 of the pair of first telescopic poles 20 is attached to the second adjustment element 60. The second button 58 is attached to the second adjustment element 60. Depression of the second button 58 initiates moving of the second adjustment element 60, which allows for customizable height level of the pair of second telescopic poles 66. The back pad 16 is pivotally attached to the first adjustment element 22. Shown herein, the back pad 16 is rectangular in shape. However, the back pad 16 may be made in a plurality of geometric shapes to support the user's 12 back. The pair of second telescopic poles 66 connects the second adjustment element 60 to the second pole base 68. The plurality of wheels 30 are connected to the second pole base 68, as discussed above with specific reference to FIG. 2. The seat platform 24 is connected to the second adjustment element 60.

The seat platform 24 has the seat top 38, the seat bottom 40, the left side 70 and the right side 72, discussed above with specific reference to FIG. 4. Shown herein, the seat platform 24 is rectangular in shape. However, the seat platform 24 may be made in a plurality of geometric shapes to provide a place for the user 12 to sit. When the seat platform 24 is fully extended, a right angle is formed between the seat platform 24 and the back pad 16. The baggage platform 32 extends horizontally from the second pole base 68 and is parallel with the seat platform 24, when the seat platform 24 is fully extended.

Shown herein, the pair of support legs 28 have a telescoping property, thereby allowing their length to be altered. The pair of support legs 28 are folded under seat bottom 40. When the pair of support legs 28 are folded out, they extend vertically from the seat bottom 40, one on each of the left side 70 and the right side 72. The support legs 28 are tensioned to help keep baggage 34, shown in FIG. 3, on the baggage platform 32, as discussed above with specific reference to FIG. 4. On the seat bottom 40, the track 44 runs along each of the left side 70 and the right side 72. The support legs 28 traverse along the track 44 to accommodate baggage 34 of various thickness.

Figure 8:
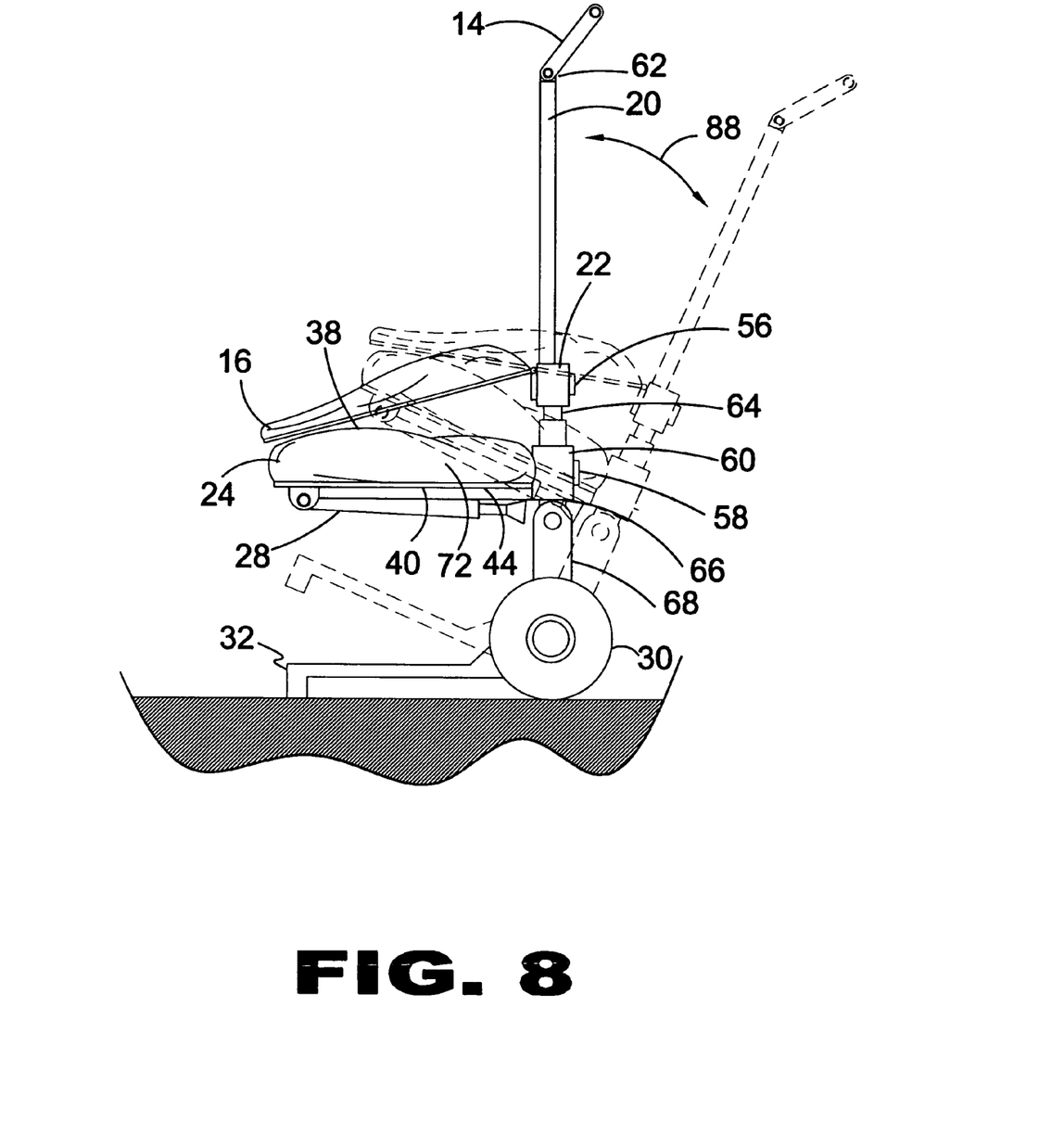
FIG. 8 is an illustrative view of the seated baggage carrier of the present invention in use.

FIG. 8 is an illustrative view of the seated baggage carrier 10 of the present invention. The seated baggage carrier 10 includes the toting handle 14, attached to the first side 62 of the pair of first telescopic poles 20 via the first adjustment element 22. The first button 56 is attached to the first adjustment element 22. Depression of the first button 56 initiates moving of the first adjustment element 22, which allows for customizable height level of the pair of first telescopic poles 20. The second side 64 of the pair of first telescopic poles 20 is attached to the second adjustment element 60. The second button 58 is attached to the second adjustment element 60. Depression of the second button 58 initiates moving of the second adjustment element 60, which allows for customizable height level of the pair of second telescopic poles 66. The back pad 16 is pivotally attached to the first adjustment element 22. Shown herein, the back pad 16 is rectangular in shape. However, the back pad 16 may be made in a plurality of geometric shapes to support the user's 12 back. The pair of second telescopic poles 66 connects the second adjustment element 60 to the second pole base 68. The plurality of wheels 30 are connected to the second pole base 68, as discussed above with specific reference to FIG. 2.

The seat platform 24 is connected to the second adjustment element 60. The seat platform 24 has the seat top 38, the seat bottom 40, the left side 70 and the right side 72, discussed above with specific reference to FIG. 4. Shown herein, the seat platform 24 is rectangular in shape. However, the seat platform 24 may be made in a plurality of geometric shapes to provide a place for the user 12 to sit. When the seat platform 24 is fully extended, a right angle is formed between the seat platform and the back pad 16. The baggage platform 32 extends horizontally from the second pole base 68 and is parallel with the seat platform 24, when the seat platform 24 is fully extended.

Shown herein, the pair of support legs 28 have a telescoping property, thereby allowing their length to be altered. The pair of fold out support legs 28 are folded under seat bottom 40. The support legs 28 are tensioned to help keep baggage 34, shown in FIG. 3, on the baggage platform 32, as discussed above with specific reference to FIG. 4. On the seat bottom 40, the track 44 runs along each of the left side 70 and the right side 72. The support legs 28 traverse along the track 44 to accommodate baggage 34 of various thickness.

Shown herein, the seated baggage carrier 10 of the present invention has been slightly tilted as indicated by a tilt directional arrow 88. The dotted outline of the seated baggage carrier 10 shows the invention in the tilted position, making for easy movement of the seated baggage carrier 10.

Figure 9:
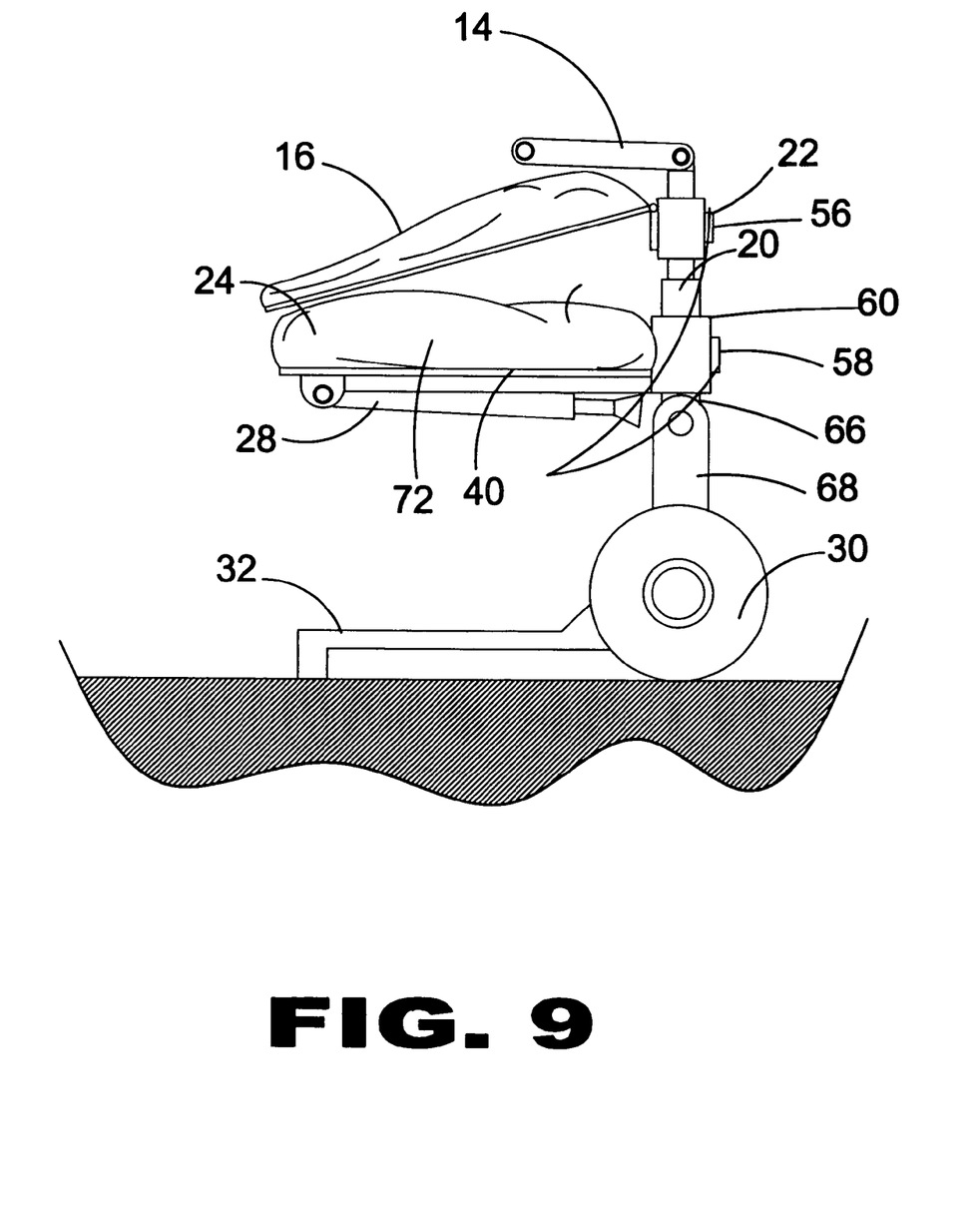
FIG. 9 is a perspective view of the side of the seated baggage carrier of the present invention.

FIG. 9 is a perspective view of the side of the seated baggage carrier 10 of the present invention. The seated baggage carrier 10 includes the toting handle 14, attached to the first side 62 of the pair of first telescopic poles 20 via the first adjustment element 22. The first button 56 is attached to the first adjustment element 22. Depression of the first button 56 initiates moving of the first adjustment element 22, which allows for customizable height level of the pair of first telescopic poles 20. The second side 64 of the pair of first telescopic poles 20 is attached to the second adjustment element 60. The second button 58 is attached to the second adjustment element 60. Depression of the second button 58 initiates moving of the second adjustment element 60, which allows for customizable height level of the pair of second telescopic poles 66. The back pad 16 is pivotally attached to the first adjustment element 22. Shown herein, the back pad 16 is rectangular in shape. However, the back pad 16 may be made in a plurality of geometric shapes to support the user's 12 back. The pair of second telescopic poles 66 connects the second adjustment element 60 to the second pole base 68. The plurality of wheels 30 are connected to the second pole base 68, as discussed above with specific reference to FIG. 2.

The seat platform 24 is connected to the second adjustment element 60. The seat platform 24 has the seat top 38, the seat bottom 40, the left side 70 and the right side 72, discussed above with specific reference to FIG. 4. Shown herein, the seat platform 24 is rectangular in shape. However, the seat platform 24 may be made in a plurality of geometric shapes to provide a place for the user 12 to sit. When the seat platform 24 is fully extended, right angle is formed between the seat platform 24 and the back pad 16. The baggage platform 32 extends horizontally from the second pole base 68 and is parallel with the seat platform 24, when the seat platform 24 is fully extended.

Shown herein, the seated baggage carrier 10 is in the folded position. The first telescopic poles 20 and the second telescopic poles 66 have been retracted by depressing the first button 56 and second button 58 respectively. Retracting the second telescopic poles 66 has lowered the seat platform 24. The back pad 16 has been folded upward and brought downward. The pair of fold out support legs 28 are folded under seat bottom 40. Additionally, the toting handle 14 can be rotated downward into a more compact placement.

It will be understood that each of the elements described above, or two or more together may also find a useful application in other types of devices differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An apparatus for retaining and transporting baggage comprising:
   a) a selectively mobile structure having a guide handle for controlling movement thereof and means for moving said structure connected at an end opposite said guide handle;
   b) a first platform connected at an end opposite said guide handle and adjacent to said moving means for retaining baggage thereon;
   c) a second platform pivotally connected to said structure at a point substantially equidistant from said guide handle and said first platform;
   d) means pivotally connected to an underside of said second platform for supporting said second platform against a surface, wherein upon pivoting said second platform about a pivot point, said second platform moves from a first position parallel to said structure to a second position perpendicular to said structure and said support means pivots and is parallel to said structure and engages said surface to support a predetermined amount of weight resting on said second platform while simultaneously retaining any baggage on said first platform; and
   e) wherein said structure comprises:
      i) a first adjustment element connected to said guide handle;
      ii) a second adjustment element for connecting said second platform to said structure;
      iii) a base connected to said first platform and for retaining said moving means therein;
      iv) a first adjustment member connected between said first adjustment element and said second adjustment element; and
      v) a second adjustment element connected between said second adjustment element and said base; wherein each adjustment element is able to selectively adjust a height of each of said first adjustment element and said second adjustment element.

2. The apparatus as recited in claim 1 wherein said first adjustment member and said second adjustment member comprise at least one telescoping pole.

3. The apparatus as recited in claim 1, further comprising a first control button positioned on said first adjustment element for selectively determining a height of said first adjustment member.

4. The apparatus as recited in claim 1, further comprising a second control button positioned on said second adjustment element for selectively determining a height of said second adjustment member.

5. The apparatus as recited in claim 1, wherein said second platform further comprises a cushion disposed on a side opposite said support means.

6. The apparatus as recited in claim 1, wherein said support means comprise a first leg connected along a first side of said underside of said second platform and a second leg connected along a second side opposite said first side.

7. The apparatus as recited in claim 1, wherein said support means is pivotable between a first position wherein said support means is parallel to said second platform and adjacent said underside thereof and a second position wherein a right angle is formed between said support means and said underside of said second platform.

8. The apparatus as recited in claim 1, further comprising a track positioned on said underside of said second platform between said structure and an edge of said second platform opposite the point of connection of said second platform and said structure, wherein said support means is moveable along a length of said track.

9. The apparatus as recited in claim 8, further comprising a tension spring connected between said support means and said structure for controlling movement of said support means along said length of said track.

10. The apparatus as recited in claim 9, further comprising a locking mechanism for locking said support means in a first position comprising said support means at said edge of said second platform opposite said structure.

11. The apparatus as recited in claim 10, wherein upon unlocking said locking mechanism, said tension spring causes said support means to move along said track in a direction towards said structure.

12. The apparatus as recited in claim 10, wherein upon unlocking said locking mechanism, said support means moves along said length of said track until said support means contacts said baggage being retained on said first platform thereby further aiding in retaining said baggage thereon.

13. The apparatus as recited in claim 1, further comprising a third platform pivotally connected to said structure adjacent said guide handle.

14. The apparatus as recited in claim 13, wherein said third platform is pivotable between a first position wherein said third platform is parallel to said structure and a second position wherein said third platform is parallel to each of said first and second platforms.

15. The apparatus as recited in claim 13, wherein said third platform further comprises a second cushion.

16. The apparatus as recited in claim 15, further comprising a lumbar support positioned on said third platform for providing lumbar support to a user supported by said second platform.

17. The apparatus as recited in claim 13, wherein said second platform is a seat and said third platform is a back support.

* * * * *